(12) United States Patent
Tsutsumitake

(10) Patent No.: US 12,041,375 B2
(45) Date of Patent: Jul. 16, 2024

(54) IMAGE SYNTHESIS DEVICE FOR ELECTRONIC MIRROR AND METHOD THEREOF

(71) Applicant: Kabushiki Kaisha Toshiba, Tokyo (JP)

(72) Inventor: Hideyuki Tsutsumitake, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/459,788

(22) Filed: Sep. 1, 2023

(65) Prior Publication Data
US 2023/0412756 A1 Dec. 21, 2023

Related U.S. Application Data

(63) Continuation of application No. 17/729,080, filed on Apr. 26, 2022, now Pat. No. 11,800,045, which is a
(Continued)

(30) Foreign Application Priority Data

Jan. 20, 2017 (JP) .................................. 2017-008584

(51) Int. Cl.
*H04N 5/262* (2006.01)
*B60R 1/26* (2022.01)
(Continued)

(52) U.S. Cl.
CPC .............. *H04N 5/2628* (2013.01); *B60R 1/26* (2022.01); *G06T 3/4038* (2013.01);
(Continued)

(58) Field of Classification Search
CPC .... H04N 19/70; H04N 19/177; H04N 19/436; H04N 19/184; H04N 19/187; H04N 19/44; H04N 19/82; H04N 19/86
See application file for complete search history.

(56) References Cited

U.S. PATENT DOCUMENTS

| 8,493,233 B2 * | 7/2013 | Hirota ...................... B60R 1/00 340/901 |
| 2003/0095688 A1 * | 5/2003 | Kirmuss .......... G08B 13/19695 348/E7.086 |

(Continued)

FOREIGN PATENT DOCUMENTS

| GB | 2544158 A | 5/2017 |
| JP | 2008-83786 | 4/2008 |

(Continued)

*Primary Examiner* — Joseph Suh
(74) *Attorney, Agent, or Firm* — Oblon, McClelland, Maier & Neustadt, L.L.P.

(57) ABSTRACT

According to one embodiment, an image synthesis device for an electronic mirror includes a rear camera which obtains a first image from a first position, and a side camera which obtains a second image of the same direction with a view of the rear camera from a second position. The second image includes a view obstruction. When a part of the first image is connected as a complementary image to the view obstruction of the second image, an image processing device converts an image of the view obstruction into a translucent image, superimposes the complementary image on the translucent image, and obtains a third image which remains an outline of the complementary image.

12 Claims, 12 Drawing Sheets

Related U.S. Application Data continuation of application No. 17/323,033, filed on May 18, 2021, now Pat. No. 11,356,618, which is a continuation of application No. 16/661,439, filed on Oct. 23, 2019, now Pat. No. 11,044,421, which is a continuation of application No. 15/659,725, filed on Jul. 26, 2017, now Pat. No. 10,506,178.

(51) Int. Cl.

| | | |
|---|---|---|
| *G06T 3/4038* | (2024.01) | |
| *G06T 11/00* | (2006.01) | |
| *G06T 11/60* | (2006.01) | |
| *H04N 5/272* | (2006.01) | |
| *H04N 7/18* | (2006.01) | |
| *H04N 23/81* | (2023.01) | |
| *H04N 23/90* | (2023.01) | |

(52) U.S. Cl.
CPC ............ *G06T 11/001* (2013.01); *G06T 11/60* (2013.01); *H04N 5/272* (2013.01); *H04N 7/181* (2013.01); *H04N 23/811* (2023.01); *H04N 23/90* (2023.01); *B60R 2300/105* (2013.01); *B60R 2300/303* (2013.01); *B60R 2300/306* (2013.01); *B60R 2300/8046* (2013.01); *B60R 2300/8066* (2013.01)

(56) References Cited

U.S. PATENT DOCUMENTS

| | | | | |
|---|---|---|---|---|
| 2007/0077025 | A1* | 4/2007 | Mino | G06F 16/5838 |
| | | | | 707/E17.023 |
| 2008/0079554 | A1* | 4/2008 | Boice | B60R 25/305 |
| | | | | 348/148 |
| 2008/0166023 | A1* | 7/2008 | Wang | G06T 7/20 |
| | | | | 356/27 |
| 2014/0292805 | A1* | 10/2014 | Yamada | G09G 5/00 |
| | | | | 345/629 |
| 2015/0103172 | A1* | 4/2015 | Shimizu | B60R 11/04 |
| | | | | 348/148 |
| 2015/0222861 | A1* | 8/2015 | Fujii | G06T 11/00 |
| | | | | 348/143 |
| 2016/0272165 | A1* | 9/2016 | Hsiao | G02B 27/0006 |
| 2016/0345260 | A1* | 11/2016 | Johnson | H04W 52/0261 |
| 2016/0350974 | A1* | 12/2016 | Hashimoto | G06F 3/14 |
| 2016/0371886 | A1* | 12/2016 | Thompson | G06F 3/013 |
| 2017/0001578 | A1* | 1/2017 | Buschmann | H04N 23/55 |
| 2017/0045877 | A1* | 2/2017 | Shapiro | B23K 26/08 |
| 2017/0053619 | A1* | 2/2017 | Husain | G09G 5/10 |
| 2017/0120817 | A1* | 5/2017 | Kuehnle | B60R 1/00 |
| 2017/0264817 | A1* | 9/2017 | Yan | H04N 23/682 |
| 2017/0280091 | A1* | 9/2017 | Greenwood | H04N 5/265 |
| 2017/0364066 | A1* | 12/2017 | Yamada | B60W 30/18163 |
| 2018/0186290 | A1* | 7/2018 | Ward | H04N 7/181 |
| 2018/0244199 | A1* | 8/2018 | Gyori | H04N 7/181 |
| 2018/0269026 | A1* | 9/2018 | Hoque | H01J 37/265 |
| 2018/0330526 | A1* | 11/2018 | Corcoran | G06T 7/74 |
| 2019/0138259 | A1* | 5/2019 | Bagaria | G06F 3/1454 |
| 2019/0150006 | A1* | 5/2019 | Yang | G06N 3/08 |
| | | | | 455/422.1 |

FOREIGN PATENT DOCUMENTS

| | | |
|---|---|---|
| JP | 2009-225322 | 10/2009 |
| JP | 2010-149847 | 7/2010 |
| JP | 2011-213186 | 10/2011 |
| JP | 4883977 | 2/2012 |
| JP | 2013-124467 | 6/2013 |
| JP | 5500877 | 5/2014 |
| JP | 2014-116756 | 6/2014 |
| JP | 2014-197818 | 10/2014 |
| JP | 2015-74436 | 4/2015 |
| JP | 2016-111509 | 6/2016 |
| JP | 2016-175586 | 10/2016 |
| WO | WO 2015/104860 A1 | 7/2015 |

\* cited by examiner

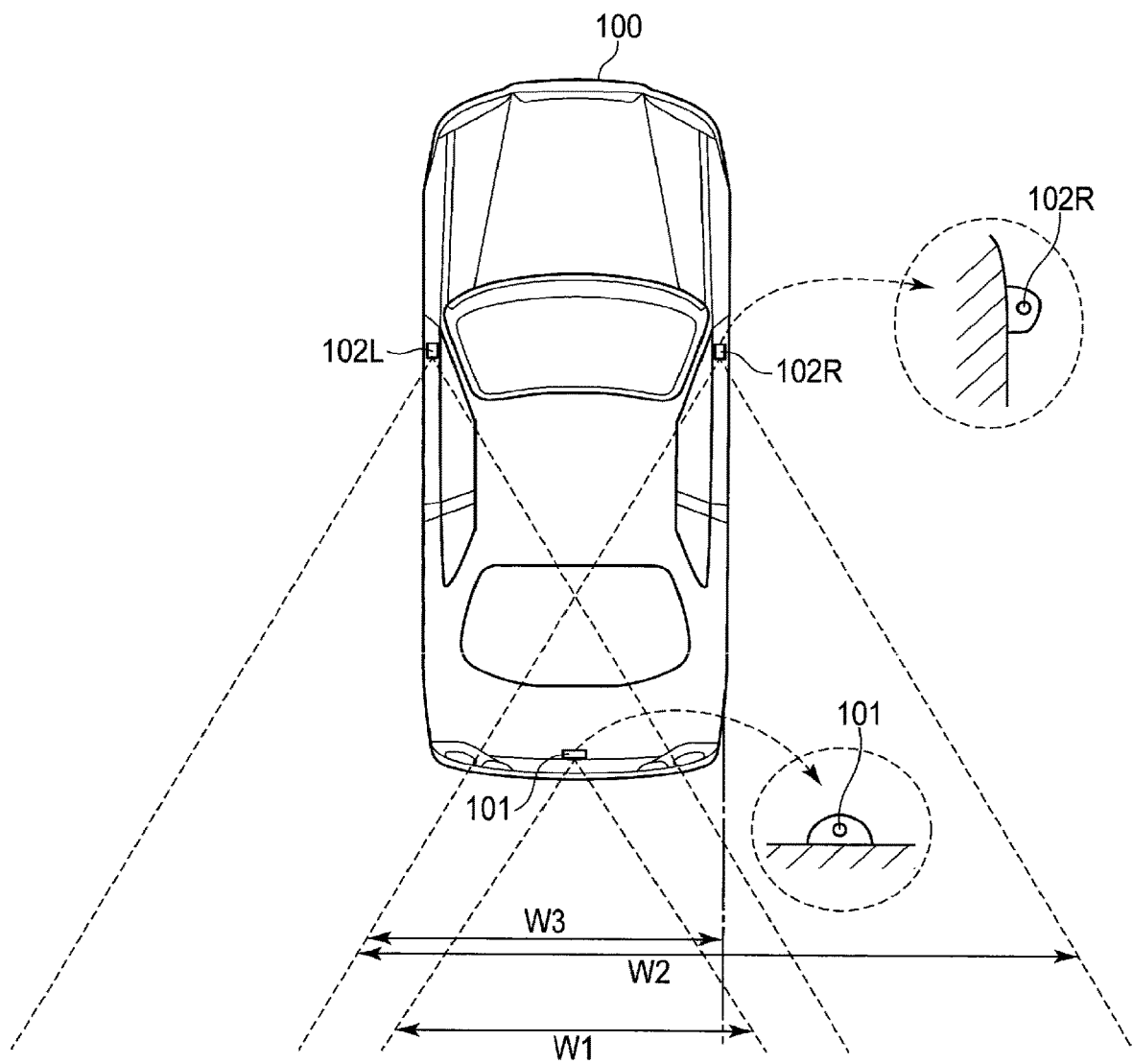
F I G. 1

$$\begin{bmatrix} h0 & h1 & h2 \\ h3 & h4 & h5 \\ h6 & h7 & 1 \end{bmatrix} \begin{bmatrix} xi \\ yi \\ 1 \end{bmatrix} = \begin{bmatrix} ui \\ vi \\ 1 \end{bmatrix}$$

$$\begin{bmatrix} x0 & y0 & 1 & 0 & 0 & 0 & -u0x0 & -u0y0 \\ 0 & 0 & 0 & x0 & y0 & 1 & -v0x0 & -v0y0 \\ x1 & y1 & 1 & 0 & 0 & 0 & -u1x1 & -u1y1 \\ 0 & 0 & 0 & x1 & y1 & 1 & -v1x1 & -v1y1 \\ x2 & y2 & 1 & 0 & 0 & 0 & -u2x2 & -u2y2 \\ 0 & 0 & 0 & x2 & y2 & 1 & -v2x2 & -v2y2 \\ x3 & y3 & 1 & 0 & 0 & 0 & -u3x3 & -u3y3 \\ 0 & 0 & 0 & x3 & y3 & 1 & -v3x3 & -v3y3 \end{bmatrix} \begin{bmatrix} h0 \\ h1 \\ h2 \\ h3 \\ h4 \\ h5 \\ h6 \\ h7 \end{bmatrix} = \begin{bmatrix} u0 \\ v0 \\ u1 \\ v1 \\ u2 \\ v2 \\ u3 \\ v3 \end{bmatrix}$$

F I G. 7

IMAGE SYNTHESIS DEVICE FOR ELECTRONIC MIRROR AND METHOD THEREOF

CROSS-REFERENCE TO RELATED APPLICATIONS

This application is a continuation of and claims the benefit of priority under 35 U.S.C. § 120 from U.S. application Ser. No. 17/729,080 filed Apr. 26, 2022, which is a continuation of U.S. application Ser. No. 17/323,033 filed May 18, 2021 (now U.S. Pat. No. 11,356,618 issued Jun. 7, 2022), which is a continuation of U.S. application Ser. No. 16/661,439 filed Oct. 23, 2019 (now U.S. Pat. No. 11,044,421 issued Jun. 22, 2021), which is a continuation of U.S. application Ser. No. 15/659,725 filed Jul. 26, 2017 (now U.S. Pat. No. 10,506,178 issued Dec. 10, 2019), and claims the benefit of priority under 35 U.S.C. § 119 from Japanese Patent Application No. 2017-008584 filed Jan. 20, 2017, the entire contents of each of which are incorporated herein by reference.

FIELD

Embodiments described herein relate generally to an image synthesis device for an electronic mirror and a method thereof.

BACKGROUND

For example, an electronic mirror is configured to cause a display to display the images obtained by a plurality of cameras provided in a vehicle, instead of the images of the conventional rearview or side mirrors.

In the system of the electronic mirror, the cameras are attached to different positions in the vehicle. Thus, when the cameras capture the view behind the vehicle in the same direction, a part area included in an effective region which can be captured by the field of view of one of the cameras may be a blind region (ineffective region) which cannot be captured by the field of view of another camera.

As described above, in the electronic mirror, when the cameras capture the view behind the vehicle in the same direction, an effective region and an ineffective region differ among the cameras.

BRIEF DESCRIPTION OF THE DRAWINGS

A general architecture that implements the various features of the embodiments will now be described with reference to the drawings. The drawings and the associated descriptions are provided to illustrate the embodiments are not to limit the scope of the invention.

FIG. 1 is a plan view showing a vehicle (car).

FIG. 7 is an explanatory diagram showing an example of a determinant for projective transformation.

DETAILED DESCRIPTION

Various embodiments will be described hereinafter with reference to the accompanying drawings.

The embodiments provide an image synthesis device for an electronic mirror and a method thereof in which, even when a field of view includes an obstruction, the image of the obstruction is made translucent and is replaced by an effective image (complementary image).

In general, according to one embodiment, an image synthesis device for an electronic mirror comprises:

a first camera which obtains a first image of a first view by a first field of view from a first position;

a second camera which obtains a second image by a second field of view from a second position different from the first position, the second field of view including a view obstruction in a direction of the first view; and an image processing device which converts, when a part of the first image is connected as a complementary image to a part of the second image, an image of the view obstruction included in the second image into a translucent image, superimposes the complementary image on the translucent image, and obtains a third image by providing a border between the first image and the complementary image in an outline of the translucent image and connecting the first image and the complementary image.

An embodiment will further be described with reference to the drawings.

Figure 2:
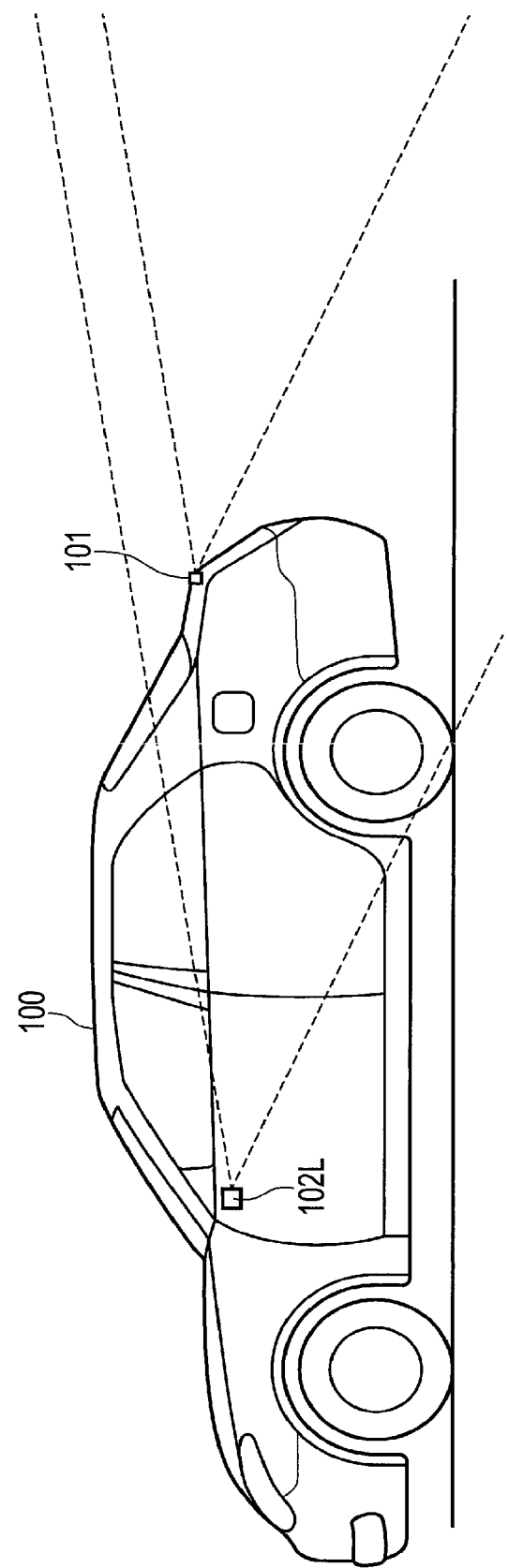
FIG. 2 is a side view showing the vehicle of FIG. 1.

FIG. 1 is a plan view showing a vehicle 100. FIG. 2 is a side view of the vehicle shown in FIG. 1.

The vehicle 100 comprises a first camera 101 on a rear trunk or near a license plate. The first camera 101 is capable of capturing the rear view. The vehicle 100 comprises second and third cameras 102R and 102L at the positions of side mirrors. The second and third cameras 102R and 102L are also capable of capturing the rear view.

As described above, the first to third cameras 101, 102R and 102L are attached to different positions in the vehicle 100. Thus, when each camera captures the view behind the vehicle, an effective region which can be captured by the field of view (W1) of camera 101 may be a blind region (an ineffective region or a field of view W3) which cannot be captured by the field of view of camera 102R or 102L (for example, a field of view W2).

According to the present embodiment of the image synthesis device for the electronic mirror, the first camera 101 obtains a first image (rear image) of a first view by the first field of view W1 from a first position (for example, the position of the trunk). The second camera 102R obtains a second image by the second field of view W2 including a view obstruction (a side of the own vehicle) in the direction of the first view from a second position (a lateral position of the driver seat or the position of a side door) different from the first position (the position of the trunk). Thus, the second image includes the image of a side of the own vehicle.

As described later, an image processing device 200 connects a part of the first image as a complementary image to a part of the second image. In this case, the image processing device 200 converts the image of the view obstruction (a side of the own vehicle) included in the second image into a translucent image, and superimposes the complementary image on the translucent image. The image processing device 200 obtains a third image by providing a border between the first image and the complementary image in the outline of the translucent image (in other words, the outline of a side of the own vehicle) and connecting the complementary image to the first image.

The complementary image superimposed on the region of the translucent image is obtained by connecting (or synthesizing or combining) a projective transformation image based on a far plan position and a projective transformation image based on a ground position closer to the capture position than the far plan position.

When the horizontal direction of the first and second cameras is a right-and-left direction, and the perpendicular direction is an upper-and-lower direction, the upper region of the complementary image corresponds to an image obtained by applying projective transformation based on the far plan position, and the lower region of the complementary image corresponds to an image obtained by applying projective transformation based on the ground position.

The image of the view obstruction undergoes a process for averaging the luminance of a plurality of frames, and is made translucent. In this manner, a vehicle running side by side, a vehicle coming in the opposite direction or the light of a lamp is not reflected on the door (having a mirror effect) of the own vehicle in the image.

The lower region of the complementary image includes an image filled with a color similar to the color of the surrounding image. Thus, the portion under the vehicle (for example, a road) is displayed by presumption. In this manner, the screen can be stable as a whole.

Figure 3:
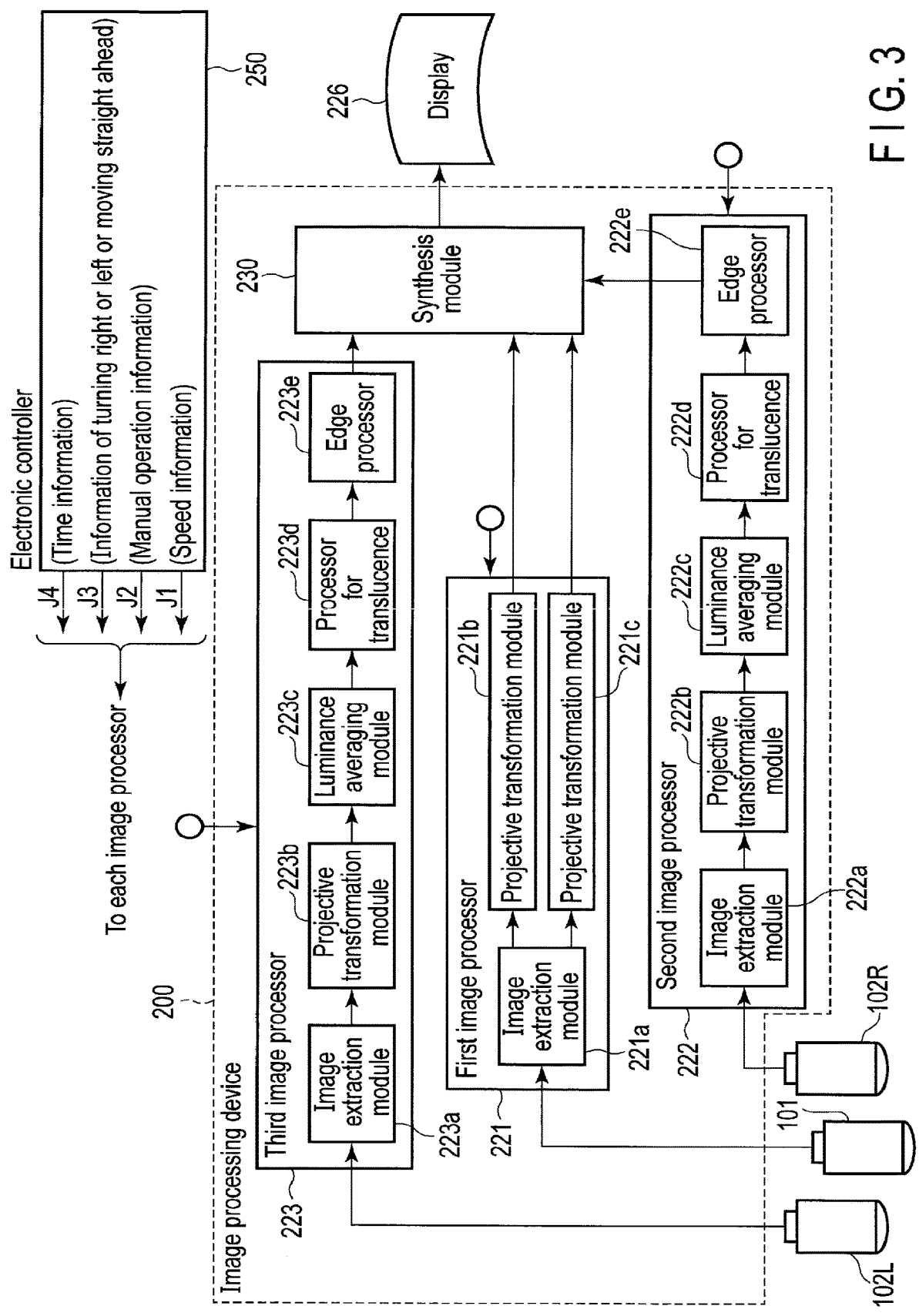
FIG. 3 is a block configuration diagram showing a system of an electronic mirror to which one embodiment is applied.

FIG. 3 shows electronic processing blocks for performing the above processes. FIG. 3 shows the first camera (rear camera) 101, the second camera (right side camera) 102R and the third camera (left side camera) 102L. The capture signals of cameras 101, 102R and 102L are input to the image processing device 200.

The capture signal of the first camera 101 is input to an image extraction module 221a of a first image processor 221. The capture signal of the second camera (right side camera) 102R is input to an image extraction module 222a of a second image processor 222. The capture signal of the third camera (left side camera) 102L is input to an image extraction module 223a of a third image processor 223.

Each of the first to third cameras 101, 102R and 102L obtains an image of a region of a wide angle including a region wider than the image to be used. Each of extraction modules 221a, 222a and 223a extracts the image region to be used from the image of the region of a wide angle. The extraction position and the extraction region may be changed in accordance with the speed of the vehicle, the vibration of the vehicle and the control direction of the wheel. The normal setting position of the extraction position and/or the extraction region may be changed by user operation. This is also effective when an image is experimentally monitored or tested.

In the first image processor 221, projective transformation modules 221b and 221c apply projective transformation to the image signal extracted by image extraction module 221a. Subsequently, the image signal is input to a synthesis module 230. Projective transformation modules 221b and 221c are capable of obtaining a projective transformation image based on a far plan position and a projective transformation image based on a ground position closer to the capture position than the far plan position.

Projective transformation module 221b transforms an image at the viewpoint of the first camera 101 into an image at the viewpoint of the second camera 102R and an image at the viewpoint of the third camera 102L based on a far plan position. Projective transformation module 221c transforms an image at the viewpoint of the first camera 101 into an image at the viewpoint of the second camera 102R and an image at the viewpoint of the third camera 102L based on a ground position closer to the capture position than the far plan position.

Thus, an image at the viewpoint of the first camera 101 is input to the synthesis module 230 as an image at the viewpoint of the second camera 102R (in other words, as an image obtained by transformation based on a far plan position and an image obtained by transformation based on a ground position). An image at the viewpoint of the first camera 101 is input to the synthesis module 230 as an image at the viewpoint of the third camera 102L (in other words, as an image obtained by transformation based on a far plan position and an image obtained by transformation based on a ground position).

In the second image processor 222, a projective transformation module 222b applies projective transformation to the image signal extracted by image extraction module 222a. This process of projective transformation module 222b may be omitted. Similarly, in the third image processor 223, a projective transformation module 223b applies projective transformation to the image signal extracted by image extraction module 223a. This process of projective transformation module 223b may be omitted. The degree of transformation applied in projective transformation modules 222b and 223b is less than that of the above transformation applied in projective transformation modules 221b and 221c.

Projective transformation is also called planar projective transformation or nomography transformation. Projective transformation is a technique for transforming a plane figure in a virtual plane at a viewpoint (a first viewpoint) into a plane figure in a virtual plane at another viewpoint (a second viewpoint).

The image signal obtained by the second image processor 222 includes an image of a side of the own vehicle (in other words, an image obtained by capturing a side of the right door in the direction of the rear side; an image of the view obstruction). Similarly, the image signal obtained by the third image processor 223 includes an image of a side of the own vehicle (in other words, an image obtained by capturing a side of the left door in the direction of the rear side; an image of the view obstruction).

Since the attachment position of the second camera (side camera) 102R in the vehicle is determined, the position of the region of the image of the view obstruction in the second image with respect to the angle of view is also determined. Similarly, since the attachment position of the third camera (side camera) 102L in the vehicle is determined, the position of the region of the image of the view obstruction in the third image with respect to the angle of view is also determined.

A luminance averaging processor 222c applies a process for averaging the luminance to the image of the view obstruction (in other words, the image of the right side of the own vehicle) included in the second image. This process is applied such that a vehicle running side by side, a vehicle coming in the opposite direction or the light of a lamp is not reflected on the doors (having a mirror effect) of the own vehicle in the image. Similarly, a luminance averaging processor 223c applies a process for averaging the luminance to the image of the view obstruction (the image of the left side of the own vehicle) included in the third image.

The image of the view obstruction (the image of the right side of the own vehicle) included in the second image in which the luminance has been averaged is made translucent by a processor for translucence 222d. The image of the view obstruction (the image of the left side of the own vehicle) included in the third image in which the luminance has been averaged is made translucent by a processor for translucence 223d. The degree of translucence may be arbitrarily controlled by the information from an electronic controller 250.

The second image output from processor for translucence 222d is input to an edge processor 222e such that the image of the view obstruction undergoes an edge (outline) process. Similarly, the third image output from processor for translucence 223d is input to an edge processor 223e such that the image of the view obstruction undergoes an edge (outline) process.

An edge process is, for example, a process for adding a solid or dashed line (in other words, an edge line) to an outline.

For example, the color, weight and shade of the edge line may be changed in accordance with the driving state of the vehicle or the external environment. These elements may be adjusted by user operation.

For example, when the vehicle is traveling backward, the edge may be clarified such that the distance between an obstruction and a side of the vehicle or the traveling direction of the vehicle can be easily noticed. When the vehicle is making a right turn or a left turn, the edge may be clarified such that the distance between an obstruction and a side of the vehicle or the traveling direction of the vehicle can be easily noticed.

A first image signal obtained by the above process in the first image processor 221, a second image signal obtained by the above process in the second image processor 222 and a third image signal obtained by the above process in the third image processor 223 are synthesized in the synthesis module 230.

The adjusting and controlling processes described above may be performed based on a control signal from the electronic controller 250. The electronic controller 250 has the information of the speed of the vehicle J1, the information of various types of manual operations J2, the direction information indicating the state of turning right, turning left, moving straight ahead or moving backward J3, time information J4, lighting information, the information of outside air temperature, the information of indoor temperature and other types of information.

The speed information J1 can be used as, for example, adjustment information to automatically adjust the distance between each camera and the reference plane (reference image) for changing the position of the viewpoint of the camera in projective transformation modules 221b, 221c, 222b and 223b.

The manual operation information J2 includes, for example, information used to adjust the reference position for extracting a region from an image, and information used to initially set or adjust the reference plane for projective transformation.

The direction information J3 can be used as control information for a process for expanding the region to be extracted from an image, an enlarging process, a process for changing the position of the region to be extracted, a process for making an image translucent, a process for changing the weight, color and shade of the edge, etc. For example, when the vehicle is moving forward, a process for making an image translucent is applied such that the transparency is made high (in other words, the image is made highly transparent) by the direction information J3. When the vehicle is making a left turn or a right turn, the edge is made wide and dark by the direction information J3. In this way, the distance between the vehicle and an obstruction lateral to the vehicle can be easily recognized by the driver.

The time information J4 can be used to adjust the sensitivity of each camera. When it is dark, the sensitivity of the capture signal of each camera may be made high by the time information J4. When it is light, the sensitivity may be made low by the time information J4.

Sensor information includes various types of information such as the information of external humidity and the information of outside air temperature. An appropriate image can be obtained from each camera by using the sensor information. For example, when it rains outside, a compressed air cleaner provided on a side of each camera may remove the moisture or dust around the lens. An opening for spraying compressed air may be provided in front of the lens of each camera. A heater may be further provided in front of the lens of each camera since snow or ice may be attached to the front of the camera.

In this system, a display 226 is provided at a position which is easily viewed by the driver inside the vehicle. Other displays may be additionally provided in front of the back-seat and the passenger seat such that passengers other than the driver can view the displays.

One, some or all of the internal modules of the image processing device 200 shown in FIG. 3 may be realized by software, or may be a processing device operated by software stored in a storage medium. The software may be transmitted from outside via a communication module. One, some or all of the internal modules of the image processing device 200 may be a device which receives and executes the software. A recording/reproducing device may be connected to the image processing device 200. For example, an image signal may be recorded in the recording/reproducing device in response to a traveling speed, vibration or sound set in particular.

Figure 4:
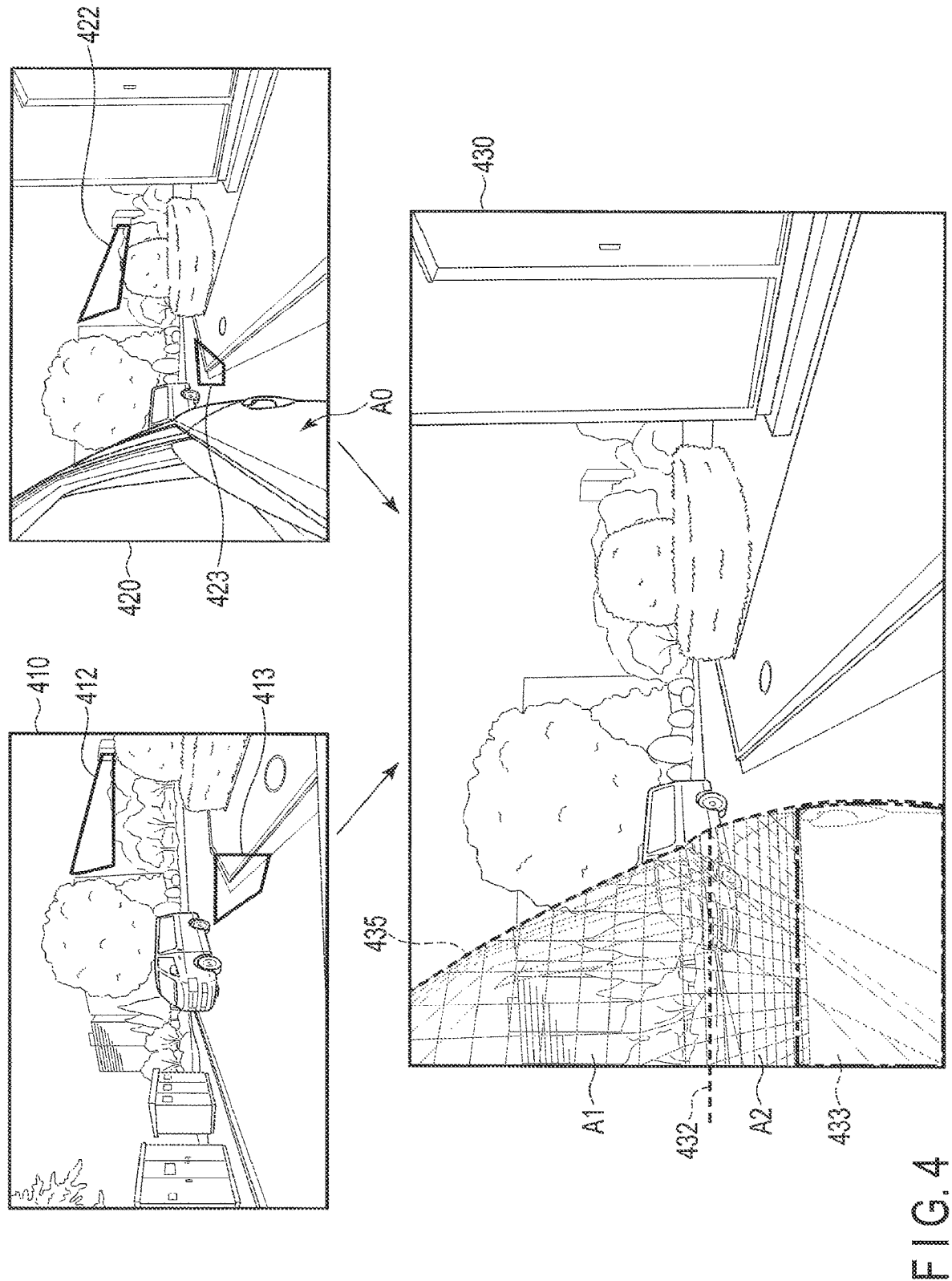
FIG. 4 show images for explaining an example of the basic operation of the system of the electronic mirror of FIG. 3.

FIG. 4 is an explanatory diagram shown for explaining the basic process for synthesizing images. A rear image 410 is a rear image extracted from an image captured by the rear camera 101. A side image 420 is a side image extracted from an image captured by the right side camera 102R.

FIG. 4 shows the rear image 410 and the side image 420 obtained from the right side camera 102R. However, the actual device also uses a side image obtained from the left side camera 102L. Here, to simplify explanation, the embodiment is described using the relationship between the rear image 410 and the side image 420.

The side image 420 includes the image (A0) of the side of the vehicle (in other words, the image of the side of the own vehicle or the image of the view obstruction) (on the left part of the side image 420). This obstructive region (the region of image A0) is a blind region in the rear view of the vehicle for the right side camera 102R.

The region of image A0 is made translucent (by processor for translucence 222d). A part of the rear image 410 (in other words, the image of a region corresponding to image A0) is superimposed on the translucent image. In this way, the images are synthesized in the synthesis module 230.

As shown in the synthesized image 430, a part of the rear image is superimposed on the translucent image of the view obstruction. In the synthesized image 430, an edge line 435 indicates the border (in other words, the combined position, connected position or outline) between the translucent image A0 and the image captured by the right side camera 102R. The edge line 435 is added by edge processor 222e.

The edge line 435 is useful for the driver to confirm the width of the own vehicle when the driver moves the vehicle forward or backing the vehicle. The width, color and brightness (shade), etc., of the edge line 435 may be changed in accordance with the surrounding state, for example, depending on whether the outside is dark or light. This structure can raise the security awareness of the driver.

In the synthesized image 430, a non-display line 432 is indicated between the upper region A1 and the lower region A2 of the translucent image A0. The line 432 is not displayed in the actual image. The line is added for explanatory purpose.

A large number of diamonds are shown in FIG. 4 and after drawings. However, the diamonds are not displayed in the actual image. The diamonds are shown to indicate that rectangles have been transformed into diamonds as a result of transformation of a viewpoint. The diamonds are not displayed in the actual image.

Each image of the upper and lower regions A1 and A2 is an image obtained by transforming the rear image 410 of the viewpoint of the rear camera 101 into the image of the viewpoint of the right side camera 102R. In this case, the reference position of transformation of the upper region A1 is a far plan position 412. The reference position of transformation of the lower region A2 is a ground position 413 closer to the position of the camera than the far plan position 412. The far plan position 412 and the ground position 413 correspond to positions 422 and 423 shown in the side image 420 of the right side camera 102R.

In FIG. 4, the image of the side of the own vehicle or the image of the view obstruction (in other words, the image of the obstructive region) is an image captured by the right side camera 102R of the vehicle. However, on the actual display 226 (FIG. 3), an image captured by the left side camera 102L of the vehicle is also displayed.

Figure 5:
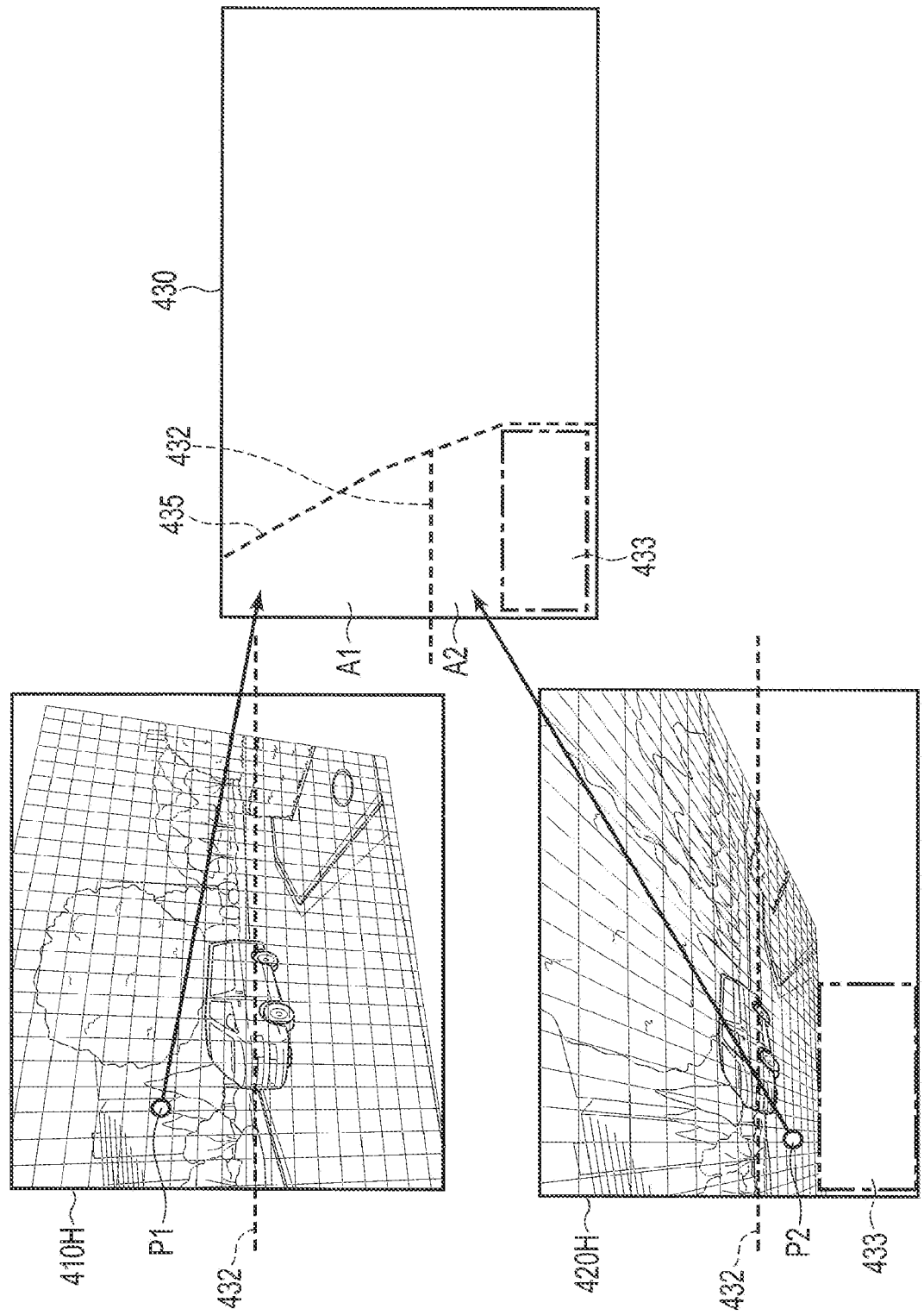
FIG. 5 show images for explaining an example of operation including projective transformation in the system of the electronic mirror of FIG. 3.

FIG. 5 shows a first projective transformation image 410H obtained by applying projective transformation such that the rear image 410 of the viewpoint of the rear camera 101 is transformed into the image of the viewpoint of the right side camera 102R based on the far plan position (the projective transformation is performed by projective transformation module 221b in FIG. 3). FIG. 5 also shows a second projective transformation image 420H obtained by applying projective transformation such that the rear image 410 of the viewpoint of the rear camera 101 is transformed into the image of the viewpoint of the right side camera 102R based on the ground plan position (the projective transformation is performed by projective transformation module 221c in FIG. 3).

The far plan position and the ground plan position may be manually adjusted by the driver before driving the vehicle. As described later, the positions may be automatically changed to predetermined positions in accordance with the speed of the vehicle.

A part of the first projective transformation image 410H (in other words, the vicinity of P1 including P1) and a part of the second projective transformation image 420H (in other words, the vicinity of P2 including P2) are extracted and synthesized in the upper and lower regions A1 and A2 of the translucent image A0, respectively. When the upper and lower regions A1 and A2 are extracted from the first and second projective transformation images 410H and 420H, respectively, the upper and lower regions A1 and A2 are extracted such that the image of each region is naturally connected to the side image of the second camera.

The region of the view obstruction in the side image 420 of the right side camera 102R includes a blind region for the rear camera 101. Thus, the region of the view obstruction includes the blind regions of both of the cameras.

This blind region is an absolute blind region 433. The absolute blind region 433 corresponds to the region under the rear part of the vehicle (normally, the surface of a road). In FIG. 5, the absolute blind region 433 is shown in the lower left part of the synthesized image 430. Since the absolute blind region 433 does not have an image, the absolute blind region 433 may be completely black or white when no process is applied.

In this system, for example, this region is complemented with the image data of the color of the image around the absolute blind region 433 or a similar color.

This system uses all of the images captured by the rear camera 101, the right side camera 102R and the left side camera 102L as effectively as possible. As a result, the absolute blind region 433 is present. However, the absolute blind region 433 is complemented with the image data of the color of the surrounding image or a similar color.

Figure 6:
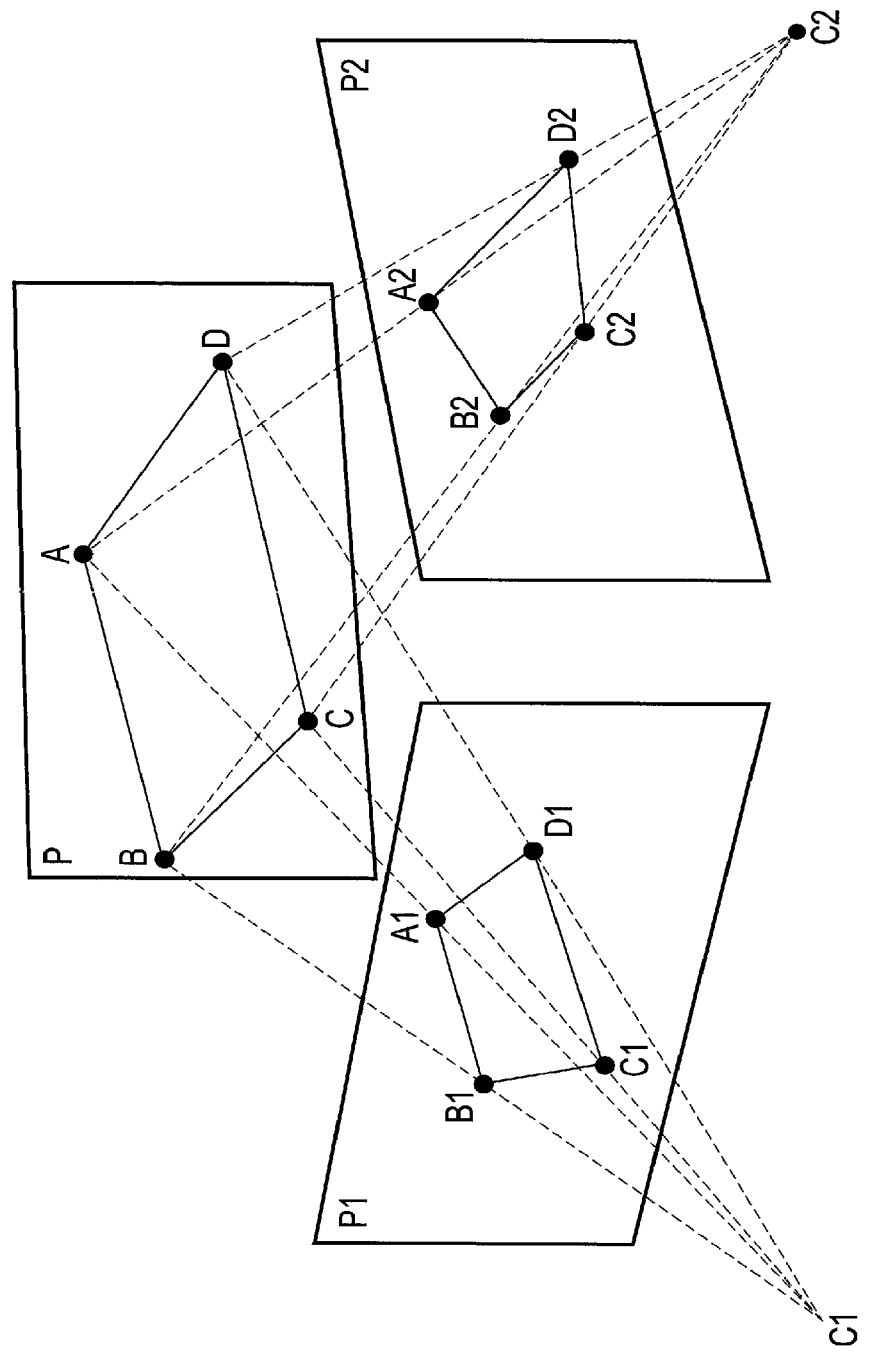
FIG. 6 is an explanatory diagram shown for explaining the basic principle of projective transformation.

FIG. 6 is a conceptual diagram shown for explaining the transformation of a viewpoint. For example, a viewpoint C1 is assumed to be the viewpoint of the first camera. A viewpoint C2 is assumed to be the viewpoint of the second camera. Pixels A1 to D1 of a reference plane P1 of viewpoint C1 are replaced with pixels A to D of a virtual plane P. Subsequently, pixels A to D of virtual plane P are transformed into pixels A2 to D2 of a virtual plane P2 of the second camera of viewpoint C2.

When virtual planes P1 and P2 are at the same position (the ground position), the image of the ground captured by the first camera may be transformed so as to be an image captured by the second camera.

When four points A to D are present in plane P, these points correspond to A1 to D1 in virtual plane P1 in the image captured from viewpoint C1, and correspond to A2 to D2 in virtual plane P2 in the image captured from viewpoint C2.

When the correspondence relationship between A1 to D1 and A2 to D2 is determined, the image captured by the first camera can be transformed so as to be the image captured by the second camera. This correspondence relationship is called projective transformation (or homography transformation), and can be expressed by a matrix.

In FIG. 7, the upper formula represents the above transformation matrix H.

When the coordinates of A1 to D1 in virtual plane P1 are (xi, yi, 1), the coordinates are transformed into the coordinates (ui, vi, 1) in virtual plane P2 by the transformation matrix H, where i represents 0, 1, 2 and 3. The coordinates are expressed by a three-dimensional homogeneous coordinate system in which one element is added to a two-dimensional plane.

The coordinates of A1 to D1 correspond to those of A2 to D2 as follows.

A1: (x0, y0, 1), B1: (x1, y1, 1), C1: (x2, y2, 1), D1: (x3, y3, 1)
A2: (u0, v0, 1), B2: (u1, v1, 1), C2: (u2, v2, 1) D2: (u3, v3, 1)

When (xi, yi, 1) and (ui, vi, 1) are known, matrix elements h0 to h7 can be calculated.

Since the number of elements of the transformation matrix H is eight, elements h0 to h7 can be calculated when the correspondence relationships of four points are obtained.

FIG. 7 shows a determinant in the lower part. The determinant is obtained by developing the upper formula for the case of i=0, 1, 2, 3 and factoring out h0 to h7. By this determinant, h0 to h7 can be calculated.

By the transformation matrix H, an arbitrary point in virtual plane P1 from viewpoint C1 can be transformed into a point in virtual plane P2 from viewpoint C2.

Figure 8:
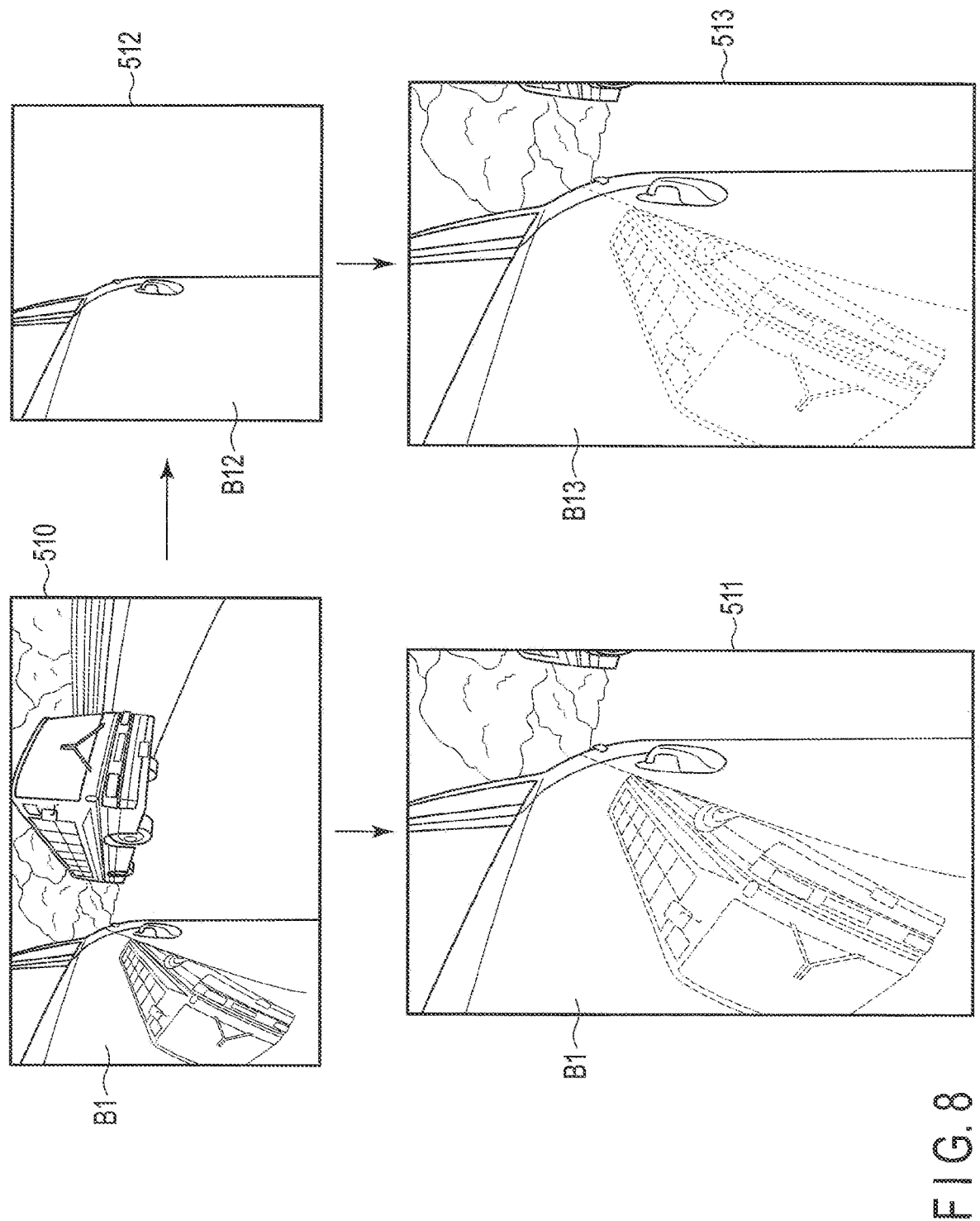
FIG. 8 is an explanatory diagram shown for explaining a process for averaging the luminance of the image of a side of the vehicle.

FIG. 8 shows an example of an image in which the luminance is averaged by luminance averaging modules 222c and 223c shown in FIG. 3. It is assumed that a bus passes by the right side of the own vehicle as shown in an image 510. In this case, the side of the own vehicle functions as a mirror. The bus is reflected on the side of the own vehicle. When this state is captured by the right side camera 102R without any process, the image captured by the right side camera 102R includes the image (B1) of the bus (see images 510 and 511).

Since the vehicle is moving, various objects, such as a bus, a landscape and a house, are reflected on the vehicle. In this system, an image obtained by averaging the luminance of image B1 of the side of the vehicle is an image B12 (see an image 512). When image B12 obtained by averaging the luminance is made translucent, the translucent image is not heavily affected by the image of reflection as shown in an image 513. Image 511 is an image obtained when the luminance is not averaged. Thus, image 511 includes an obstructive image in the region of the translucent image. However, in the system of the present embodiment, the image of the translucent region can be easily viewed.

Figure 9:
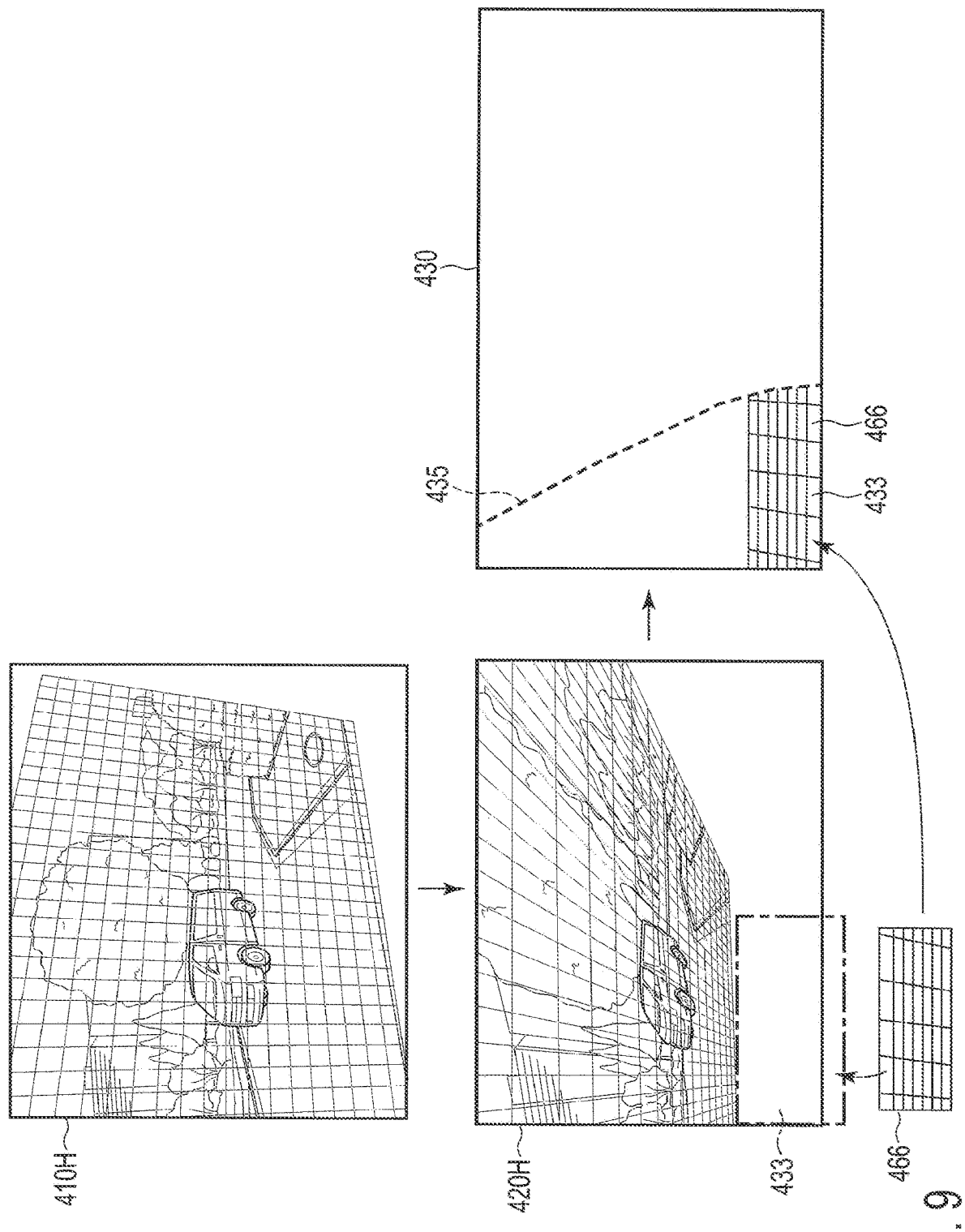
FIG. 9 is an explanatory diagram showing another example for generating an image superimposed on an absolute blind region.

FIG. 9 is an explanatory diagram showing another embodiment when the absolute blind region 433 is filled. When a fourth camera is attached to the vehicle to capture the front side, a part of the synthesized image 430 can be filled with a partial image 466 of the image captured by the fourth camera. In this case, the system uses an extraction module which extracts the image captured by the front camera, a transformation module which transforms the front-back direction of the extracted image, and a time adjustment module. The partial image 466 in which the time has been adjusted is transmitted to the synthesis module 230 as a pseudo image, and is used as the image of the absolute blind region 433.

Figure 10:
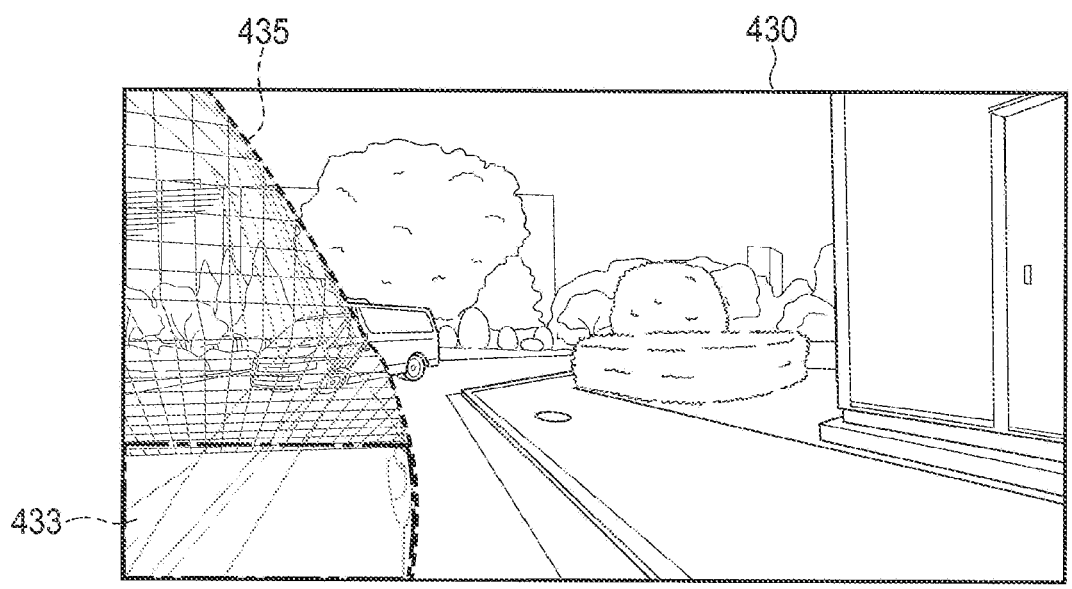
FIG. 10 is an explanatory diagram showing an example in which a pseudo image is superimposed on an absolute blind region.

FIG. 10 shows an example in which the synthesized image 430 is displayed on the display 266 in an electronic mirror using standard cameras. FIG. 10 shows the image of the right side. However, the display 226 also displays the image of the left side. In the image of the left side, similarly, a complementary image is superimposed on a translucent image. In the outline of the translucent image, a line indicating the border between the image obtained by the rear camera and the complementary image is displayed.

Figure 11:
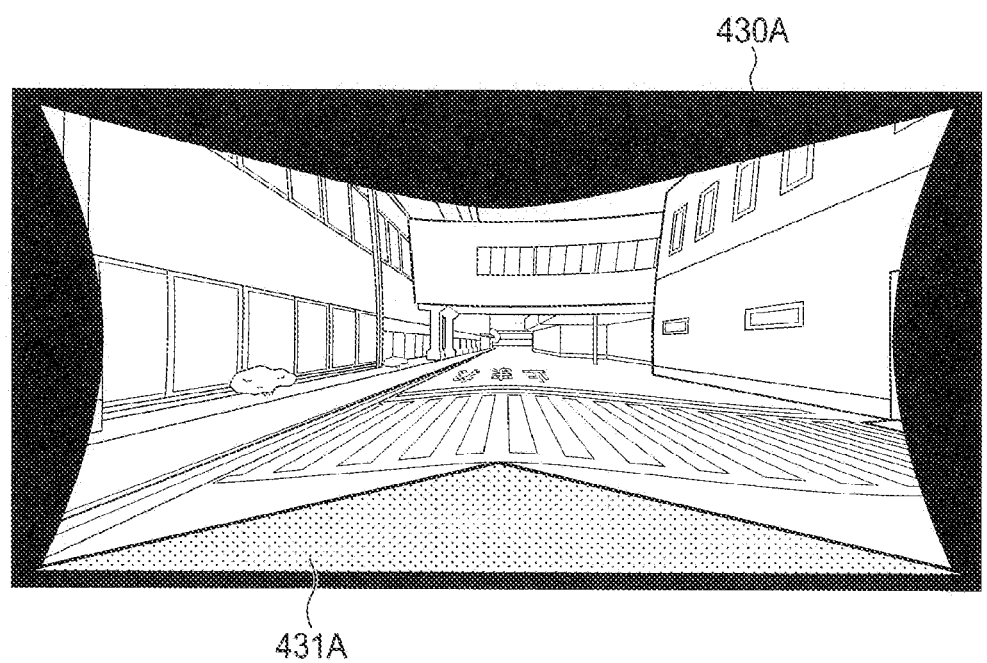
FIG. 11 is an explanatory diagram showing another example in which a pseudo image is superimposed on an absolute blind region.

FIG. 11 shows an example of a synthesized image 430A obtained when using the first, second and third cameras having an angle of view broader than that of a normal camera and configured to capture panoramic images. The synthesized image 430A also includes an absolute blind region 431A. This region is filled with a color or pattern similar to the color or pattern of the surrounding region.

Figure 12:
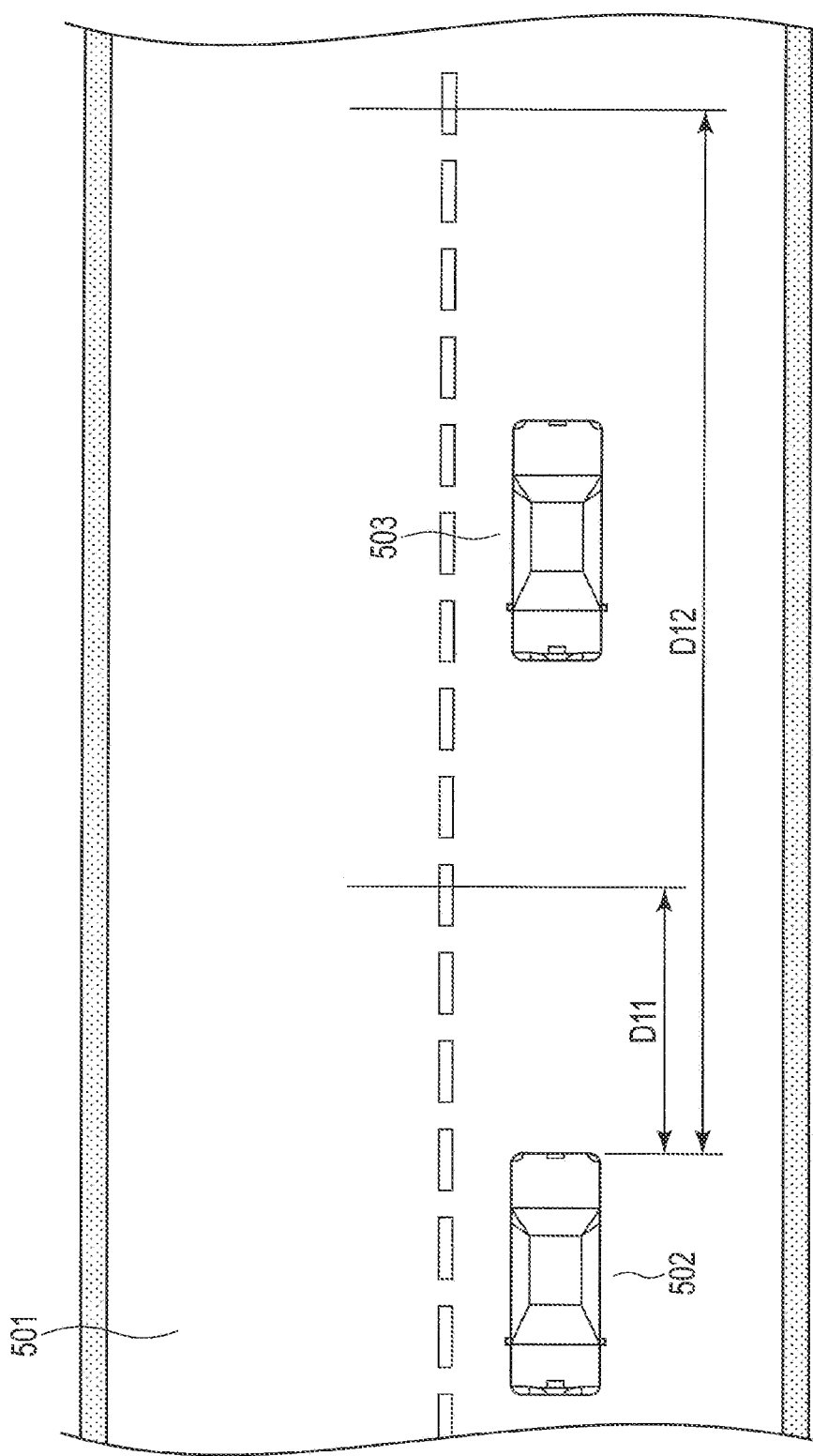
FIG. 12 is an explanatory diagram showing an example in which the distance from the vehicle moving on a road to a reference plan position (a far plan position or a ground position) is changed in accordance with the speed.

FIG. 12 is a plan view showing vehicles 502 and 503 moving on a road. The distance from vehicle 502 to the reference plan position (for example, the far plan position or the ground position shown in FIG. 4) may be automatically adjusted in accordance with the speed. When the speed is slow (for example, 0 to 35 km/h), the driver may want to pay attention to a vehicle which follows the own vehicle and is comparatively close to the own vehicle (for example, vehicle 503). When the speed is medium (for example, to 65 km/h), the driver may want to pay attention to a more distant vehicle which follows the own vehicle. When the speed is high (for example, 65 km/h or higher), the driver may want to pay attention to a far more distant vehicle which follows the own vehicle.

In this case, the distance from the own vehicle to the reference plan position (for example, the far plan position or the ground position shown in FIG. 4) may be automatically adjusted by user setting.

Figure 13:
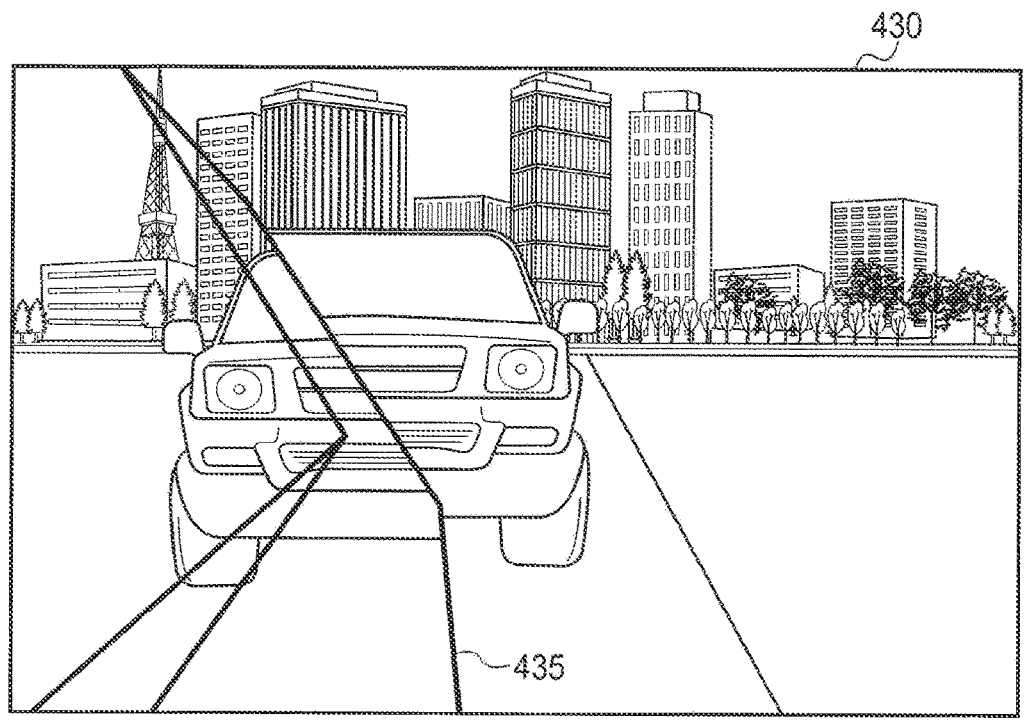
FIG. 13 shows an example of the image of the electronic mirror when the distance from the vehicle to the reference (virtual) plan position is increased to the distance to a far plan position.
Figure 14:
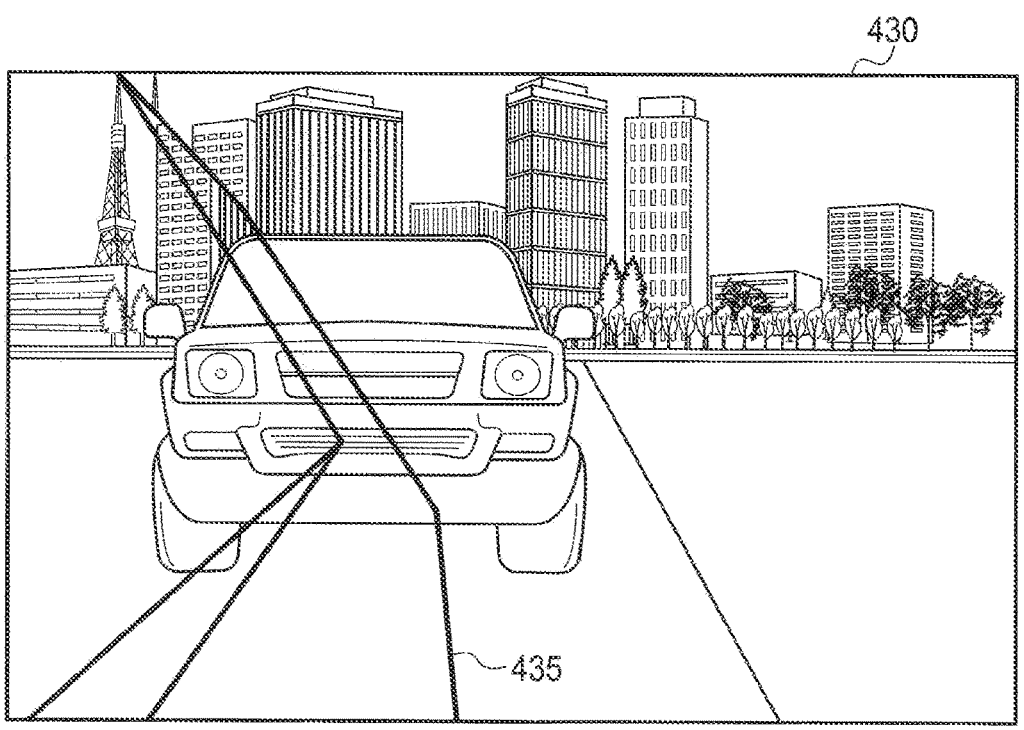
FIG. 14 shows an example of the image of the electronic mirror when the distance from the vehicle to the reference (virtual) plan position is decreased to the distance to a close plan position.

FIG. 13 shows an example of the synthesized image 430 when the reference plan position (virtual plan position) is distant. FIG. 14 shows an example of the synthesized image 430 when the reference plan position is close. In the example of FIG. 13, when the reference plan position is distant, the vertical lines of the distant buildings behind the own vehicle in the first image conform to those in the second image. However, a misalignment is caused in the portion connecting the first image and the second image in the image of the close vehicle.

As shown in FIG. 14, when the reference plan position (virtual plan position) is close, the first image is misaligned with the second image with respect to the vertical lines of the distant buildings behind the own vehicle. However, in the image of the close vehicle, the first image is smoothly connected to the second image.

In terms of the distance, an appropriate object present behind the own vehicle can be clarified by adjusting the virtual plan position in accordance with the speed of the vehicle.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image synthesis device for an electronic mirror, the device comprising:
   a rear camera which obtains a first image of a first view from a first position of a vehicle, as a rear view of the vehicle, by a first field of view;

a side camera which obtains a second image from a second position on a more front side than the first position, by a second field of view including a view obstruction as a side part of the vehicle, in a direction of the first view;

a translucent image processor which converts an image of the view obstruction included in the second image into a translucent image;

an image synthesizer which obtains a third image by synthesizing a projective transformation image, as a part of the first image, subjected to projective transformation into a view position of the side camera and corresponding to a part of the translucent image of the second image; and a recording/reproducing device being connected to the image synthesis device, and an image signal being able to record in the recording/reproducing device in response to a traveling speed, vibration or sound set in particular, wherein the projective transformation image includes a first projective transformation image obtained by subjecting an image of a viewpoint of the rear camera to projective transformation into an image of a view position of the side camera, based on a far plan position on the rear side of the vehicle, by a first image processor, and a second projective transformation image obtained by subjecting an image of a viewpoint of the rear camera to projective transformation into an image of a viewpoint of the side camera based on a ground position closer to a capture position of the side camera than the far plan position, by a second image processor; and in the first projective transformation image or the second projective transformation image, the far plan position or the ground position is adjusted by a setting made in accordance with a speed of the vehicle.

2. The image synthesis device of claim 1, further comprising:
a heater provided in front of the lenses.

3. The image synthesis device of claim 1, further comprising:
an edge processor capable of adding a line to an outline of the translucent image in the second image.

4. The image synthesis device of claim 1, wherein
when a direction of a horizontal line of the rear and side cameras is a right-and-left direction, and a direction of a perpendicular line is an upper-and-lower direction,
the first image processor generates the first projective transformation image by subjecting an upper region of the projective transformation image to projective transformation based on the far plan position, and
the second image processor generates the second projective transformation image by subjecting a lower region of the projective transformation image to projective transformation based on the ground position.

5. The image synthesis device of claim 3, further comprising:
a unit which changes any one of a thickness, a color, and concentration of the line.

6. The image synthesis device of claim 1, wherein
the synthesizer generates an image filled with a color similar to a color of a surrounding image, as an image to be further added to the projective transformation image.

7. An image synthesis method of an electronic mirror, the method using:
in an electronic mirror mounted on a vehicle to display an image of a rear side of the vehicle,
a rear camera which obtains a first image of a first view from a first position, as a rear view of the vehicle, by a first field of view;
a side camera which obtains a second image from a second position on a more front side than the first position, by a second field of view including a view obstruction as a side part of the vehicle, in a direction of the first view;
an image processor which proceeds the first image and the second image from the rear and side cameras, and
a recording/reproducing device being connected to the image synthesis device, and an image signal being able to record in the recording/reproducing device in response to a traveling speed, vibration or sound set in particular,
the method comprising:
converting an image of the view obstruction included in the second image into a translucent image;
adding a line to an outline of the translucent image in the second image; and
obtaining a third image by synthesizing a projective transformation image, as a part of the first image, subjected to projective transformation into a view position of the side camera and corresponding to a part of the translucent image of the second image, wherein
when the projective transformation image is generated,
a first projective transformation image obtained by subjecting an image of a viewpoint of the rear camera to projective transformation into an image of a view position of the side camera, based on a far plan position on the rear side of the vehicle, is generated by a first image processor,
a second projective transformation image obtained by subjecting an image of a viewpoint of the side camera to projective transformation into an image of a viewpoint of the rear camera based on a ground position closer to a capture position of the side camera than the far plan position, is generated by a second image processor, and
in the first projective transformation image or the second projective transformation image, the far plan position or the ground position is adjusted by a setting made in accordance with a speed of the vehicle.

8. The method of claim 6, further comprising: heating the lenses by a heater.

9. The method of claim 7, further comprising:
adding a line to an outline of the translucent image in the second image.

10. The method of claim 7 wherein
when a direction of a horizontal line of the rear and side cameras is a right-and-left direction, and a direction of a perpendicular line is an upper-and-lower direction,
the first projective transformation image is generated by subjecting an upper region of the projective transformation image to projective transformation based on the far plan position, and
the second projective transformation image is generated by subjecting a lower region of the projective transformation image to projective transformation based on the ground position.

11. The method of claim 9, further comprising:
changing any one of a thickness, a color, and concentration of the line.

12. The method of claim 7, wherein
an image filled with a color similar to a color of a surrounding image, is generated as an image to be further added to the projective transformation image.

* * * * *